(12) United States Patent
Han et al.

(10) Patent No.: US 11,636,137 B2
(45) Date of Patent: *Apr. 25, 2023

(54) NODE EMBEDDING IN MULTI-VIEW FEATURE VECTORS

(71) Applicant: Snap Inc., Santa Monica, CA (US)

(72) Inventors: Fangqiu Han, Los Angeles, CA (US); Xinran He, Los Angeles, CA (US); Jie Luo, Marina Del Rey, CA (US); Yu Shi, Urbana, IL (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,797

(22) Filed: Apr. 14, 2021

(65) Prior Publication Data

US 2021/0303602 A1  Sep. 30, 2021

Related U.S. Application Data

(63) Continuation of application No. 16/024,015, filed on Jun. 29, 2018, now Pat. No. 10,997,219.

(60) Provisional application No. 62/543,923, filed on Aug. 10, 2017.

(51) Int. Cl.
*G06F 16/28* (2019.01)
*G06F 16/901* (2019.01)
*H04L 51/52* (2022.01)
*G06F 3/0484* (2022.01)

(52) U.S. Cl.
CPC .......... *G06F 16/288* (2019.01); *G06F 16/285* (2019.01); *G06F 16/9024* (2019.01); *H04L 51/52* (2022.05); *G06F 3/0484* (2013.01)

(58) Field of Classification Search
CPC .. G06F 16/288; G06F 16/285; G06F 16/9024; G06F 3/0484; H04L 51/52
See application file for complete search history.

(56) References Cited

U.S. PATENT DOCUMENTS

| | | | |
|---|---|---|---|
| 9,740,368 B1 | 8/2017 | Love et al. | |
| 10,997,219 B1 | 5/2021 | Han et al. | |
| 2010/0306643 A1* | 12/2010 | Chabot | G06F 16/95 715/234 |
| 2011/0022573 A1* | 1/2011 | Champlin | G06F 16/178 707/E17.127 |
| 2012/0272160 A1 | 10/2012 | Spivack et al. | |
| 2013/0173578 A1* | 7/2013 | Epstein | G06Q 30/0256 707/706 |
| 2014/0188901 A1 | 7/2014 | Grauman et al. | |
| 2017/0270006 A1* | 9/2017 | Kandylas | G06F 16/128 |
| 2017/0337262 A1 | 11/2017 | Smith et al. | |
| 2018/0232443 A1* | 8/2018 | Delgo | G06F 16/35 |
| 2018/0300304 A1 | 10/2018 | Mullins et al. | |

(Continued)

OTHER PUBLICATIONS

"U.S. Appl. No. 16/024,015, Non Final Office Action dated Jun. 8, 2020", 14 pgs.

(Continued)

*Primary Examiner* — Dangelino N Gortayo
(74) *Attorney, Agent, or Firm* — Schwegman Lundberg & Woessner, P.A.

(57) ABSTRACT

Embodiments of the present disclosure relate generally to determining node embedding using multi-view graphs for analyzing electronic content.

19 Claims, 19 Drawing Sheets

(56) References Cited

U.S. PATENT DOCUMENTS

2018/0300308 A1    10/2018  Kabeya et al.
2018/0365272 A1*   12/2018  Sastry .................. G06F 16/211

OTHER PUBLICATIONS

"U.S. Appl. No. 16/024,015, Notice of Allowance dated Jan. 7, 2021", 9 pgs.
"U.S. Appl. No. 16/024,015, Response filed Sep. 8, 2020 to Non Final Office Action dated Jun. 8, 2020", 8 pgs.

* cited by examiner $$f_u = \oplus_{v \in \mathcal{V}} f_u^v \in R^{D \times |\mathcal{V}|},$$

WHERE $\oplus$ STANDS FOR THE DIRECT SUM.

FIG. 7A $$f_u = \oplus_{v \in \mathcal{V}} f_u^v \in R^D.$$

*FIG. 7B*

$$\log \sigma(f_u^v \cdot f_{u'}^v) + \sum_{i=1}^{K} \log \sigma(-f_u^v \cdot f_{n_i}^v) + \gamma \cdot \left\| f_u^v - \frac{1}{|\mathcal{V}|} \sum_{\tilde{v} \in \mathcal{V}} f_u^{\tilde{v}} \right\|_2 ,$$

WHERE $\sigma(x) = exp(x)/(1+exp(x))$ IS THE SIGMOID FUNCTION, $\gamma$ IS THE REGULARIZATION PARAMETER, AND, $\|\cdot\|_2$ IS THE $l$-2 NORM.

FIG. 7C

AFTER $\{f_u^v\}_{u \in \mathcal{U}, v \in \mathcal{V}}$ IS LEARNED IN THE PREVIOUS TRAVERSAL PROCESS, WE FIND THE FINAL EMBEDDING FOR NODE $u$ BY $$f_u = \oplus_{v \in \mathcal{V}} f_u^v \in R^{D \times |\mathcal{V}|}.$$

FIG. 7D

VIEW 1

ACACACAC...
BDBDBDBD...
CACACACA...
DBDBDBDB...
EGFGEFEGFE...
FEGFEGEFEF...
GEFGEFGEFG...
...

VIEW 2

ABABABAB...
BABABABA...
CDCDCDCD...
DEDEDEDE...
EFEGFEGEFE...
FGEFGEFGEF...
GEGFGEFEGFE...
...

*FIG. 7G*

NODE EMBEDDING IN MULTI-VIEW FEATURE VECTORS

CLAIM OF PRIORITY

This application is a continuation of U.S. patent application Ser. No. 16/024,015, filed on Jun. 29, 2018, which claims the benefit of priority to U.S. Provisional Application Ser. No. 62/543,923, filed on Aug. 10, 2017, each of which are hereby incorporated by reference in their entireties.

BACKGROUND

As the volume and complexity of electronic content on the Internet increases, the complexity in identifying relationships likewise increases. One method for identifying relationships between such content includes the use of multi-view graphs. Multi-view graphs include a set of nodes (e.g. associated with portions of electronic content) and a set of views (e.g., associated with a particular category of content), where edges between a pair of nodes denotes a relationship between the pair of nodes in a particular view. The manner in which edges are defined between nodes in a particular view of a graph is known as embedding. Embodiments of the present disclosure relate generally to determining node embedding using multi-view graphs for analyzing electronic content.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 7A-7D depict exemplary formulas that may be used in conjunction with embodiments of the present disclosure.

FIG. 7G-7I illustrate examples of traversing nodes from the multi-view graph depicted in FIG. 7F.

DETAILED DESCRIPTION

Glossary

Figure 1:
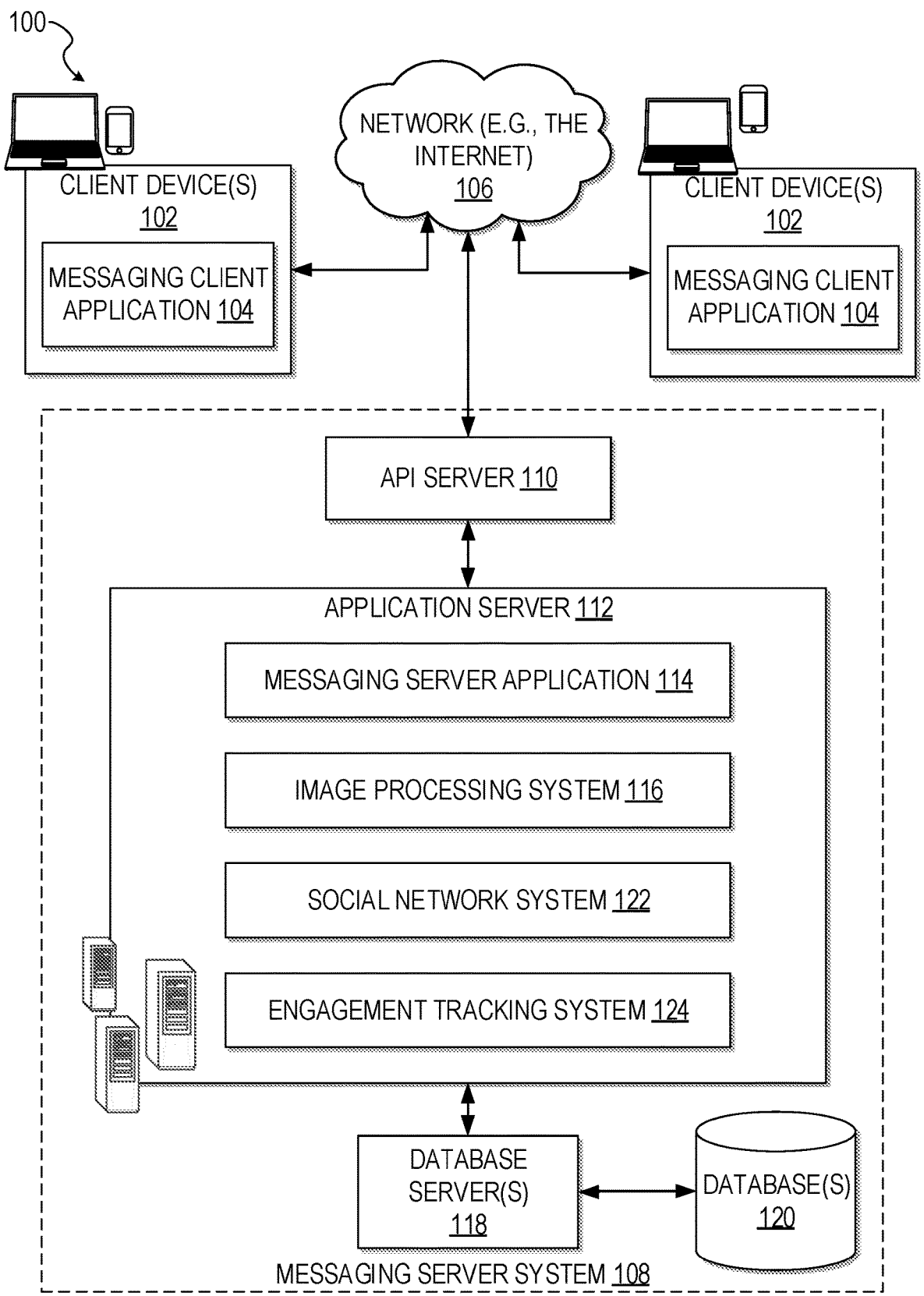
FIG. 1 is a block diagram showing an example of a messaging system for exchanging data (e.g., messages and associated content) over a network.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of exemplary methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Description

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 is a block diagram showing an exemplary messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
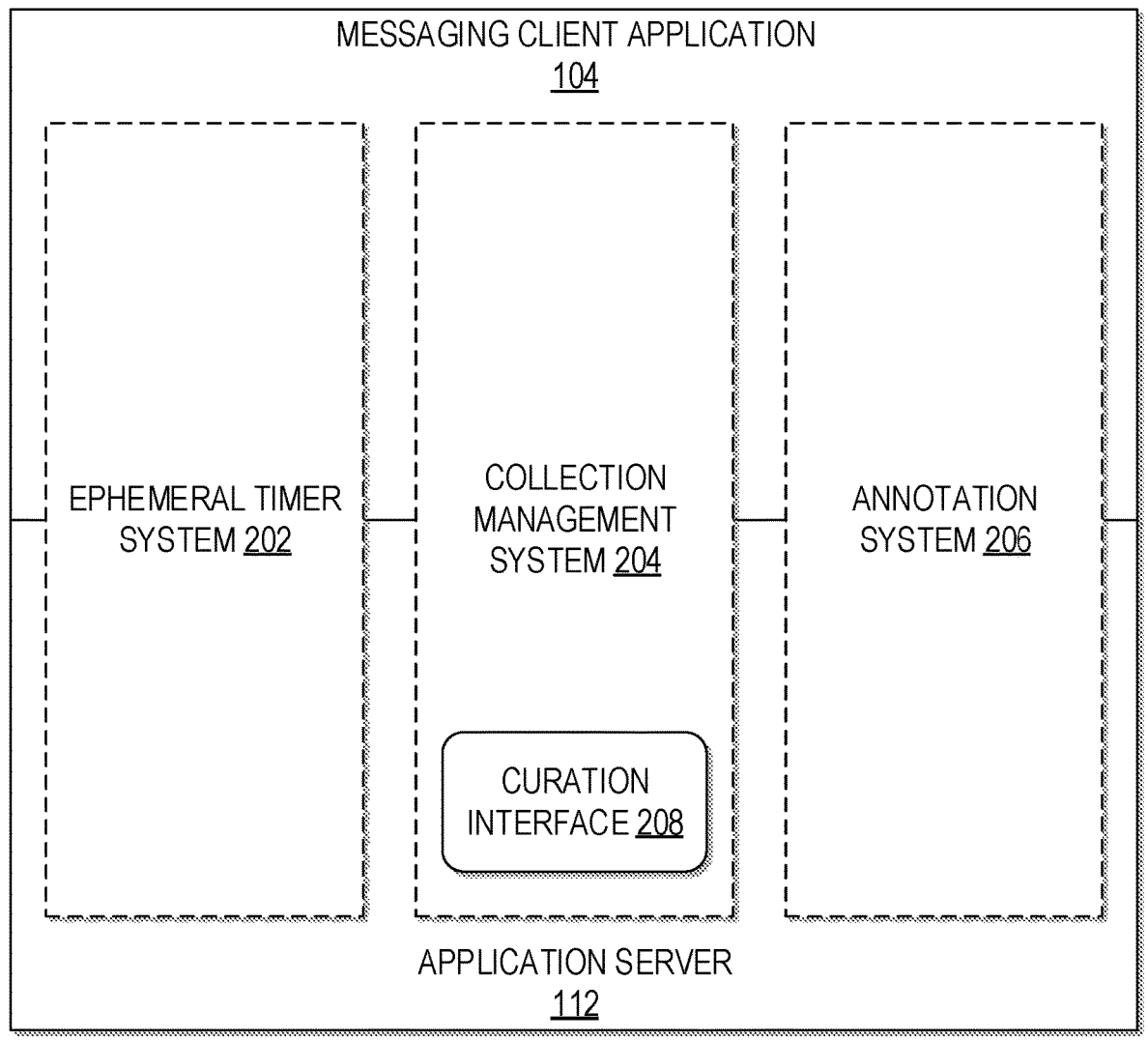
FIG. 2 is block diagram illustrating further details regarding a messaging system, according to various embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
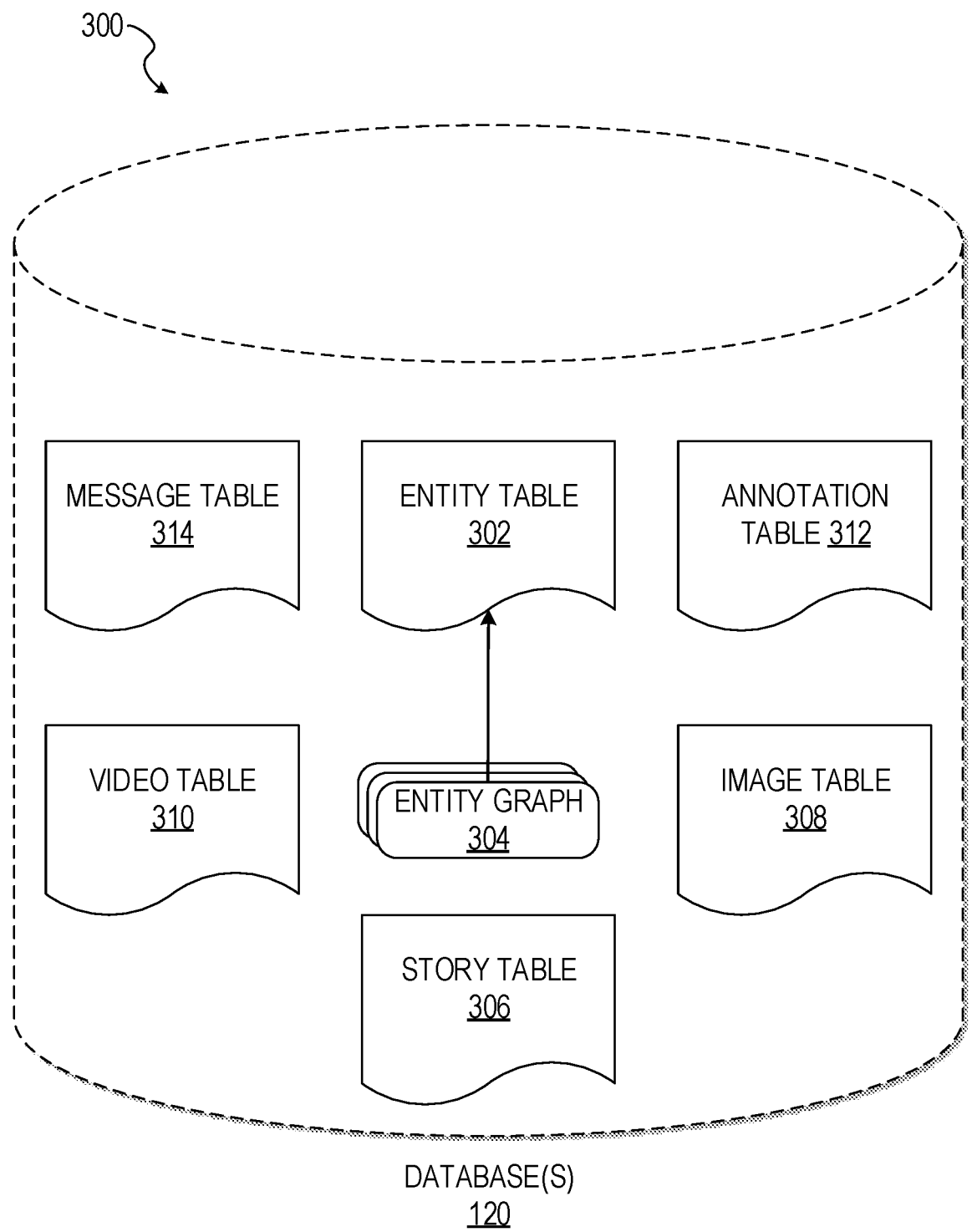
FIG. 3 is a schematic diagram illustrating data which may be stored in the database of the messaging server system, according to various embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the form of filters for example, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Examples of data filters may include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
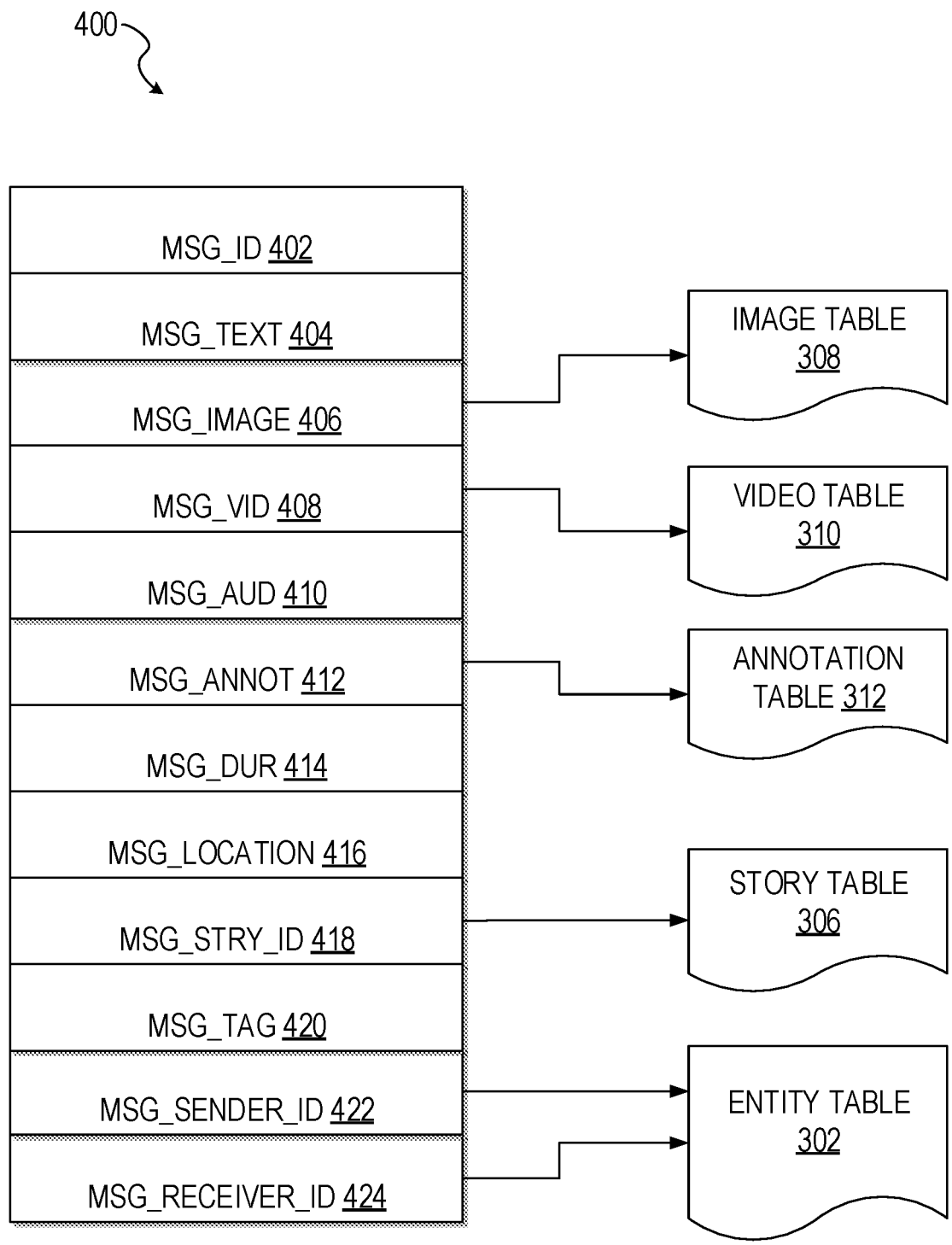
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
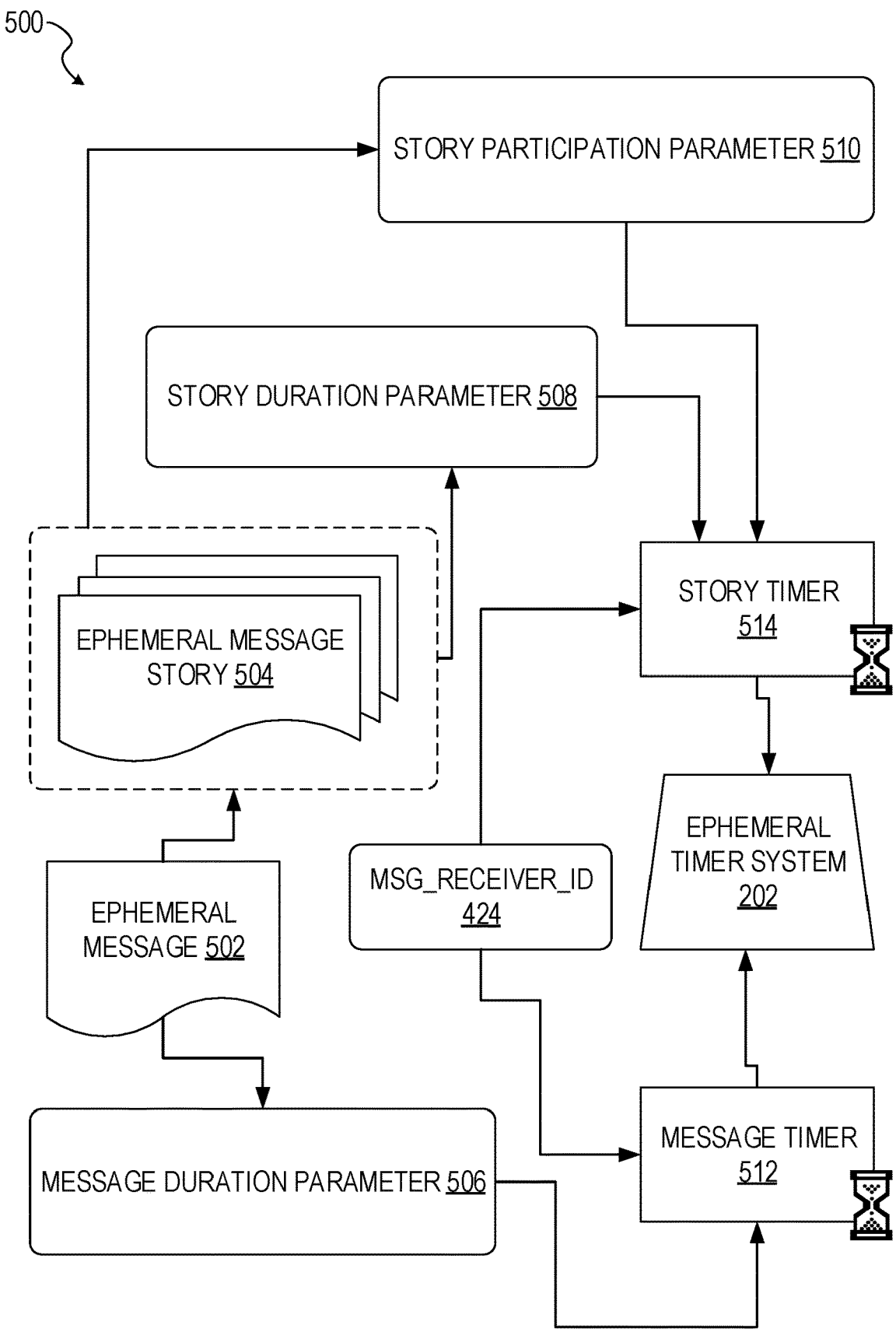
FIG. 5 is a schematic diagram illustrating an example of an access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Node Embedding in Multi-View Feature Vectors

Figure 6:
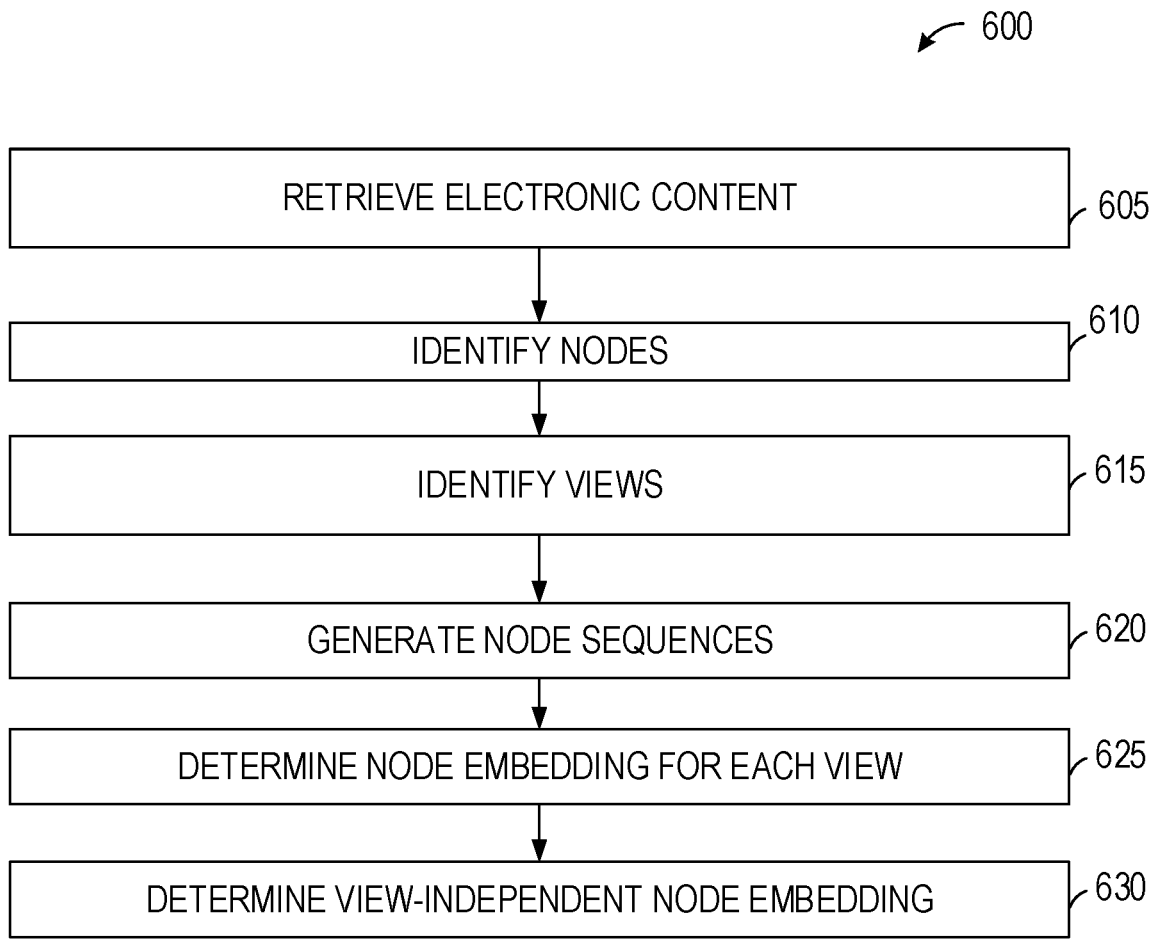
FIG. 6 is a flow diagram of an exemplary process according to various embodiments of the disclosure.

FIG. 6 depicts an exemplary process according to various aspects of the present disclosure. In this example, method 600 includes retrieving electronic content (605), identifying nodes (610) and views (615) associated with the electronic content, and generating a respective sequence of nodes (620) associated with each respective view. Method 600 further includes determining respective node embedding for each respective view (625) and determining view-independent embedding for each node (630). The steps of method 600 may be performed in whole or in part, may be performed in conjunction each other as well as with some or all of the steps in other methods, and may be performed by any number of different systems, such as the systems described in FIGS. 1, 8, and 9.

In method 600, the system retrieves electronic content (605). The system may retrieve a variety of different types of electronic content in different formats. For example, the system may retrieve electronic content containing text, images, audio, and/or video from an electronic file, such as a file stored in JPG, WAV, AVI, TXT, or other format. The system may retrieve electronic content from a variety of sources, such as from a database in communication with the system. Embodiments of the present disclosure may also retrieve electronic content by transmitting and receiving electronic communications containing electronic content such as media content items, media overlays, or other content using any form of electronic communication, such as SMS texts, MMS texts, emails, and other communications. Electronic content included in such communications may be provided as attachments, displayed inline in the message, within media overlays, or conveyed in any other suitable manner.

As used in this context, a multi-view graph $G=(U, \{E^{(v)}\}_{v \in V})$ is a graph atop a set U of nodes and a set V of views, where E(v) includes all edges in view $v \in V$. In some cases, a multi-view graph may be weighted, in which case there may exist a weight mapping $w: \{E^{(v)}\}_{v \in V} \rightarrow R$ such that $w^{(v)}_{u1,u2} := w(e^{(v)}_{u1,u2})$ is the weight of the edge $e^{(v)}_{u1,u2} \in E^{(v)}$, which joins nodes $u1 \in U$ and $u2 \in U$ in view $v \in V$. Edges between a pair of nodes denotes a relationship between the pair of nodes.

To denote node embedding in a single view, $f^v_u \in R^D$ denotes the embedding of node $u \in U$ in view $v \in V$, where $D \in N$ is the dimension of the embedding space. In some embodiments, the embedding of a node is a real-valued vector that serves as a distributed representation of the node. As a result, an embedding can be used as feature vector for various downstream applications such as node classification, recommendation, and link prediction. We note that in practice, we use embedding of a node as the feature vector.

Embodiments of the present disclosure may be used to derive a unified, view-independent embedding $f_u$ for node u in a multi-view graph. To achieve this, embodiments of the present disclosure may analyze the retrieved electronic content identify (610) a plurality of nodes within the electronic content, with each node comprising or corresponding to a portion of the electronic content. For example, in an electronic document (e.g., a file containing text and images) each identified node may correspond to a phrase appearing in the file. Edges between nodes may be associated with any desired characteristic. For example, each respective view in a plurality of views for a multi-view graph may comprise edges associated with a respective time frame.

In a particular example, consider electronic content that contains a dataset of news stories. In this example, each node may be associated with a frequently appearing phrase in the news stories, and an edge from node u1 to u2 means the phrase associated with u1 appears in a news story that also includes a phrase associated with u2. The respective views and/or respective edges in the view may likewise be associated a particular time frame. For example, an edge between two nodes may be associated with news stories published between January and February of a particular year. Similarly, a view may include nodes and edges associated with news stories published within a particular, month, year, or other time frame.

Embodiments of the present disclosure may further identify a plurality of views (615) associated with the electronic content. A view may comprise any desired categorization or collection of nodes. For example, views of text from one or more electronic files may be distinguished from each other based on date ranges, with one view containing content published in January, another view containing content published in February, and so forth. Views may overlap each other in various ways, and nodes associated with one view may also be associated with other views. For example, each respective view may be associated with a respective portion of the plurality of identified nodes, and at least a subset of the plurality of nodes may be common to at least two views in the plurality of views.

Figure 7B:
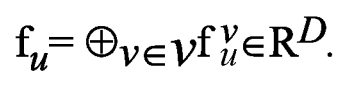

As explained in more detail below, the system may analyze the nodes corresponding to each respective views to determine the embedding (625) for each respective node in the respective view. The embedding for a node across multiple views may then be concatenated together as shown in the equation in FIG. 7A. Additionally, the system may enforce the embedding for each view to be exactly the same in the embedding learning process, as shown in the equation depicted in FIG. 7B.

Embodiments of the present disclosure provide a number of advantages with its process for determining multi-view embedding for electronic content. For example, different views may have totally different semantic meanings and may not align well with each other. Information loss would occur if all views are embedded into only one embedding space. Embodiments of the present disclosure, by contrast, allows such information across different views to be preserved. Additionally, when data is sparse and certain views are complementing each other, embedding different views jointly by embodiments of the present disclosure can help utilize richer signal and yield higher quality embedding results.

In the exemplary method 600 shown in FIG. 6, the system generates sequences of nodes (620). In some embodiments, the node sequences are generated based on a random traversal of nodes on each view of the input multi-view graph. For each respective view of the multi-view graph, the system traverses each respective node in the respective sequence of nodes for the respective view to determine a respective embedding (625) for each respective node in the respective view. For example, suppose the current node is u and the current sequence is from view v, the system may: (1) sample an adjacent node u' in the neighborhood of u along the sequence; (2) sample K negative samples of the nodes, relative to the respective node, in the sequence of nodes $\{ni\}^K_{i=1}$, from the noise distribution, where k<N is a predetermined number; and (3) perform a one-step gradient descent for the respective node based on the sampled adjacent node and the predetermined number of negative samples of nodes to update $f^v_u$ according to the equation shown in FIG. 7C.

Note that in some embodiments, each entry of $f^v_u$ can be initialized by uniformly sampling a value associated with the plurality of nodes from [−1; 1]; in other embodiments, each entry of $f^v_u$ can be initialized using a predetermined value (e.g., based on prior knowledge of the node's embedding). The final view-independent embedding for node u may be determined (830) according to the equations shown in FIG. 7D.

Figure 7E:
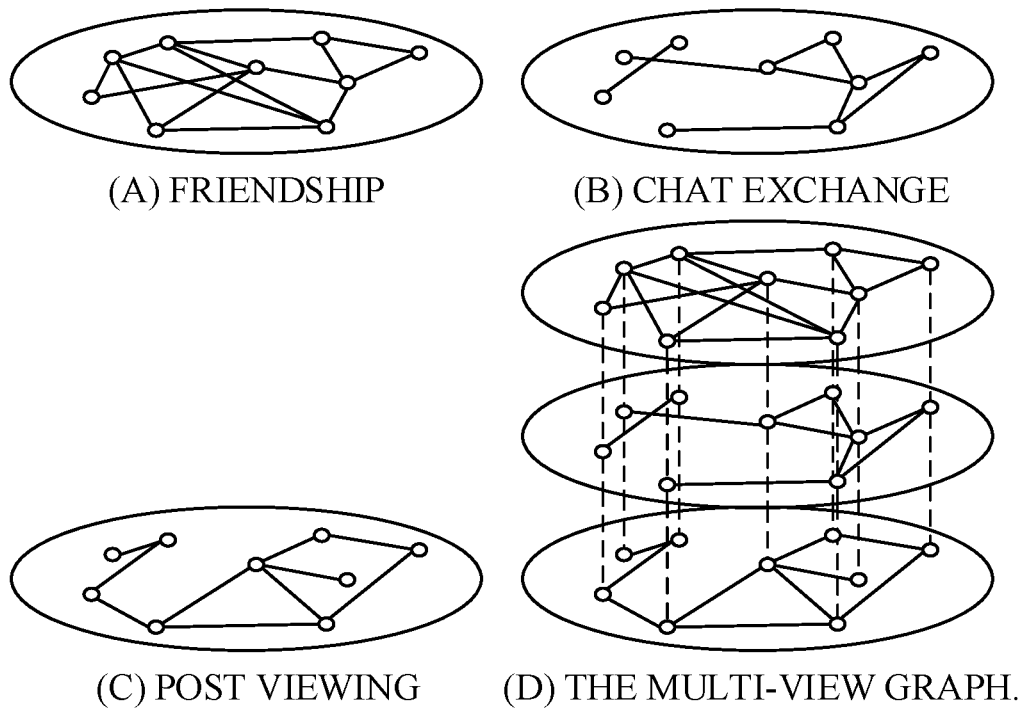
FIG. 7E-7F depict examples of multi-view graphs according to various aspects of the disclosure.

FIG. 7E illustrates an example of multi-view graph. A graph consists of a set of nodes and a set of edges, where an edge joins a pair of nodes and denotes a relationship between the pair of nodes. For instance, as shown in section "(a) Friendship," connections between users of an online social networking service (e.g., friendship) can be represented as a graph, where a node represents a user and an edge represents a friendship/connection between two users. Similarly, FIG. 7E also shows graphs for "(b) chat exchange" and "(c) post viewing." These three graphs together can form a multi-view graph as in "(d) the multi-view graph." In this example, all views share a common set of users as nodes, and each view has a distinct series of edges between the nodes.

Figure 7F:
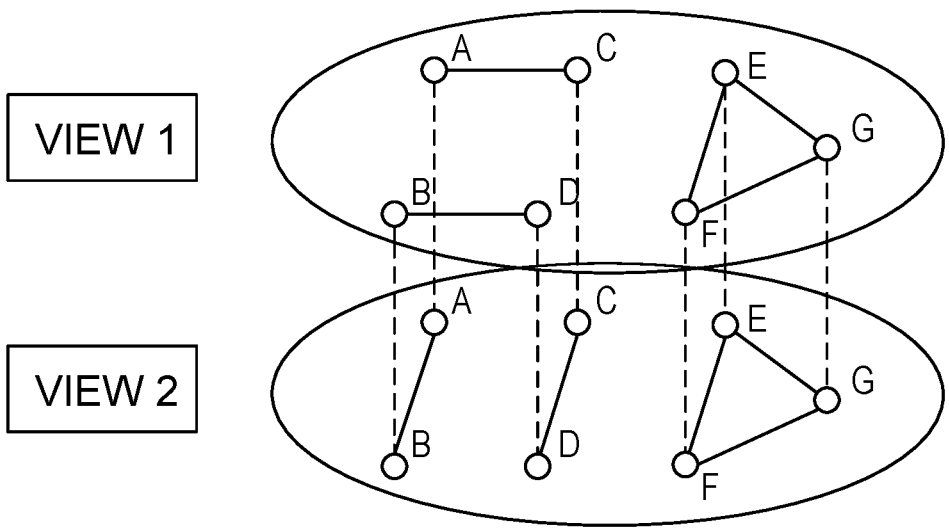

The system determines the node embedding for each view (625). FIG. 7F depicts an illustration of a multi-view graph with two views and seven nodes labeled A, B, C, D, E, F, and G, respectively. In some embodiments, the system generates a respective sequences of nodes (620) for each view, by performing a plurality of random recursive traversals of the plurality of nodes for the respective view. The system may perform such random traversals (also referred to herein as "walks") of a predetermined length (e.g., 20 nodes). The system may generate any number of sequences (e.g. 10). The system may recursively sample a current node, and randomly choose the next node to be attached to the end of the sequence from all nodes that are connected with the current node (i.e., nodes connected to the current node by an edge).

FIG. 7G illustrates an example of a portion of random walks that may be generated from the two respective views in the multi-view graph depicted in FIG. 7F. In this example, the first ten nodes in each random walk are shown, though the sequences may be of any desired length.

Figure 7H:
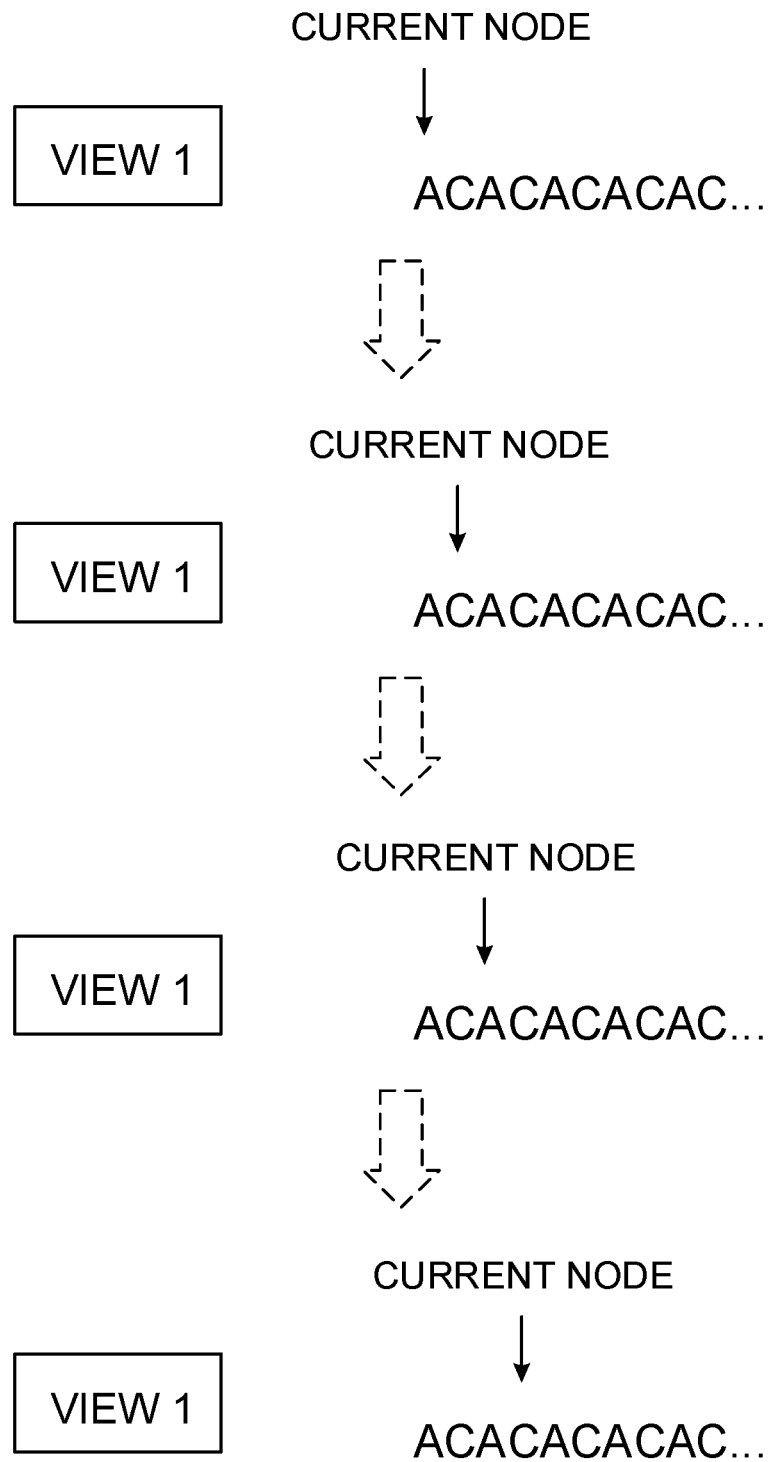
Figure 7I:
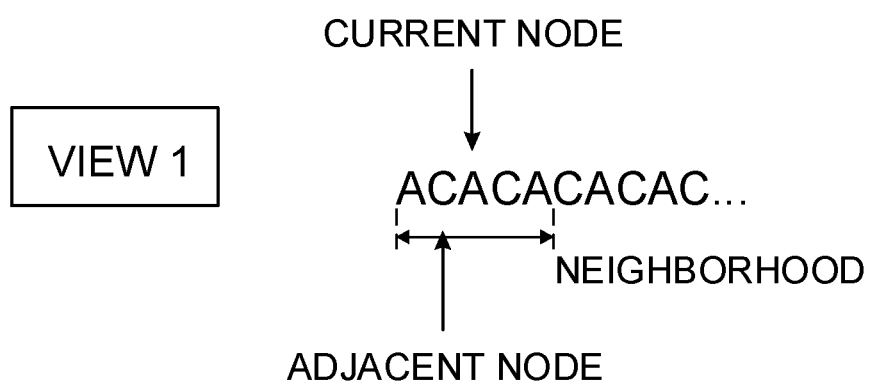

In some embodiments, each of the sequences of nodes may be traversed. FIG. 7H demonstrates the first four steps of traversing a walk in view 1, where each step processes one node. The node being processed at each step is referred to herein as the "current node." In some embodiments, an entry describing the embedding of a node is initialized by uniformly sampling a number from [0, 1]. At each step of the traversal, the embedding of the current node with regard to the current view is updated. For example, as shown in FIG. 7I, consider the current walk is generated from view 1, and the current node is "A." An adjacent node within the neighborhood of the current node is then sampled. In this context, the "neighborhood" of a node u in a sequences includes all nodes that are at most k nodes away from u. In some embodiments the variable k may be determined automatically by the system and/or specified by a user of the system. In the example shown in FIG. 7I, k is set to be 2. In this example, the sampled adjacent node is C. In other words, by notation used in Section 1, we have u=A, and u'=C.

Figure 7J:
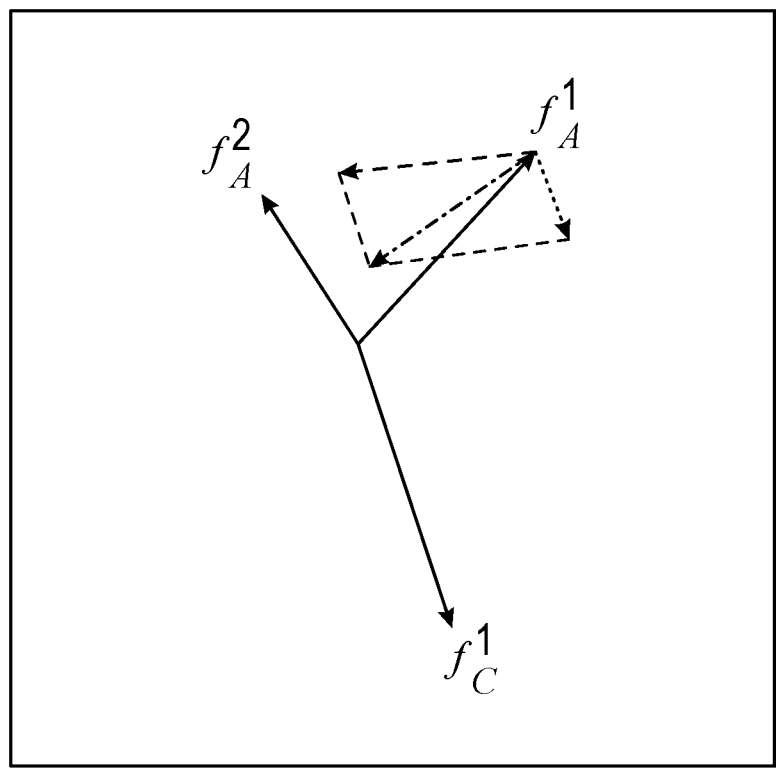
FIG. 7J-7K illustrate examples of determining the embedding for a node according to various aspects of the disclosure.

FIG. 7J illustrates an example of how the embedding of the current node may be updated by the system from the previous discussion. In this example, $f^v_u$ (the solid arrow) is the embedding vector of node u' with respect to view v represented in the 2-dimensional plane. As described previously, the update may be realized by a one-step gradient descent that updates the involved vector by moving it toward a direction opposite to the gradient, as if a force is dragging the original vector. The length of the movement is determined by the length of the gradient (magnitude of the force) multiplied by a learning rate (e.g., 0.1). Specifically, one can compute the gradient of the objective function with regard to the current node by formula in FIG. 7A. As a result, to update $f^1_A$, it will be dragged by a force parallel to the difference from $f^1_A$ to $f^2_A$ (the dashed arrow), and a force parallel to $f^1_C$ (the dotted arrow). Together, $f^1_A$ will be updated and move toward the direction of the resultant force (the alternating dotted-dashed arrow). The embedding vector for each node in each view may be determined in this manner.

Figure 7K:
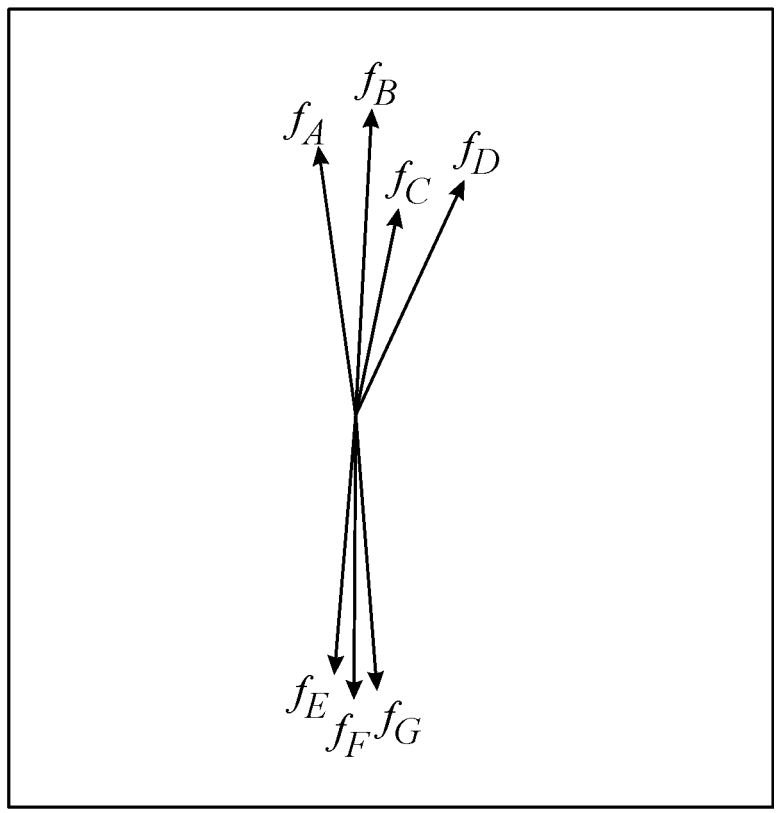

The system may determine, based on the determined embedding for each respective node in the plurality of nodes, a respective view-independent embedding (630) for each respective node. As described above, for example, the view-independent embedding $f'_u$ for each node u can be obtained by concatenation. An illustration of the final embedding result is provided in FIG. 7K, where the embedding vectors for E, F, and G are relatively close to each other because they are all connected to each other in both view 1 and view 2. In this example, A, B, C, and D are also somewhat close to each other, while being farther away from E, F, or G. This results from the fact that, as shown in FIG. 7F, A is connected to C in view 1 and to B in view 2; B is connected to D in view 1; and C and D are connected together in view 2.

Software Architecture

Figure 8:
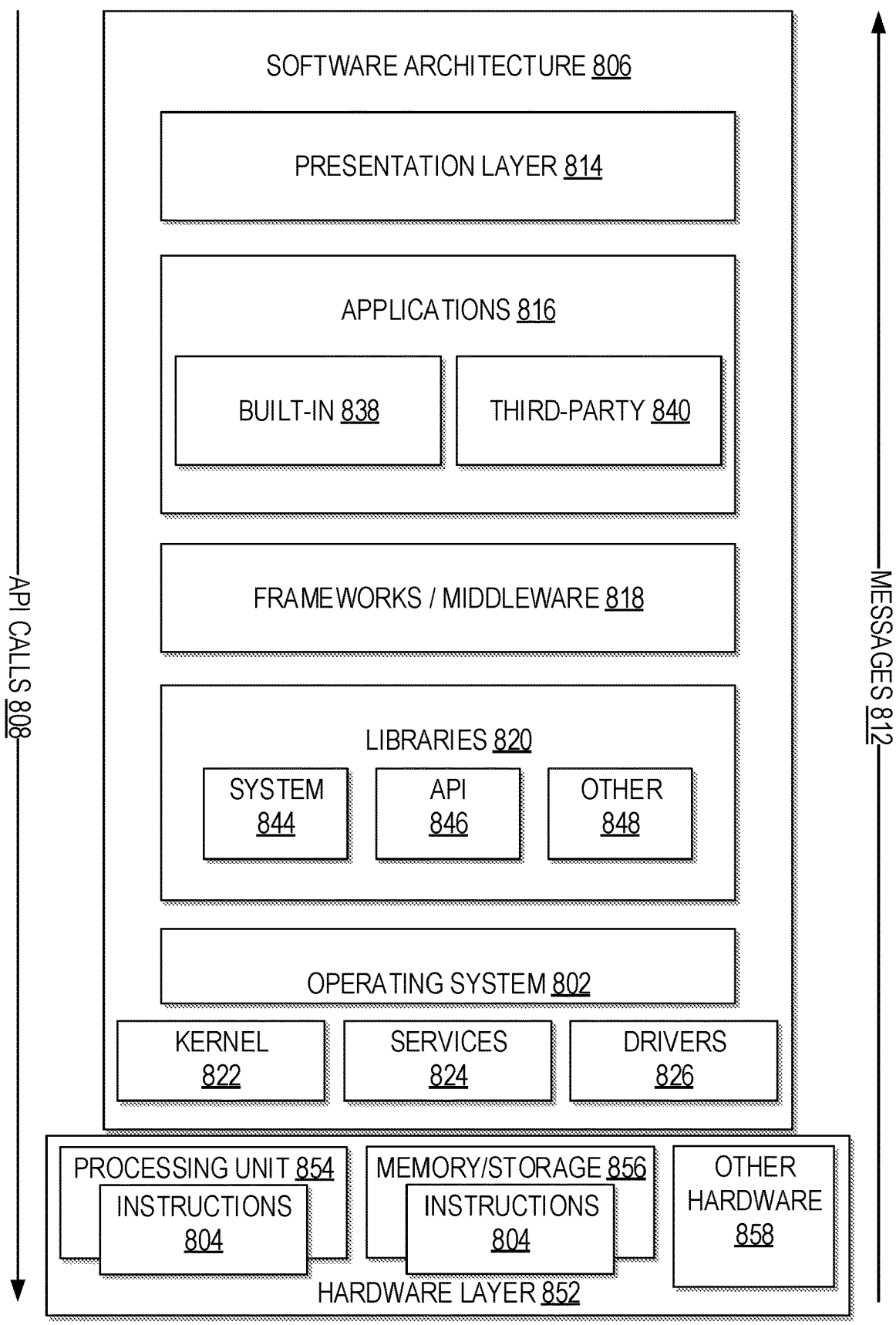
FIG. 8 is a block diagram illustrating an exemplary software architecture, which may be used in conjunction with various hardware architectures herein described.

FIG. 8 is a block diagram illustrating an exemplary software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the exemplary architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
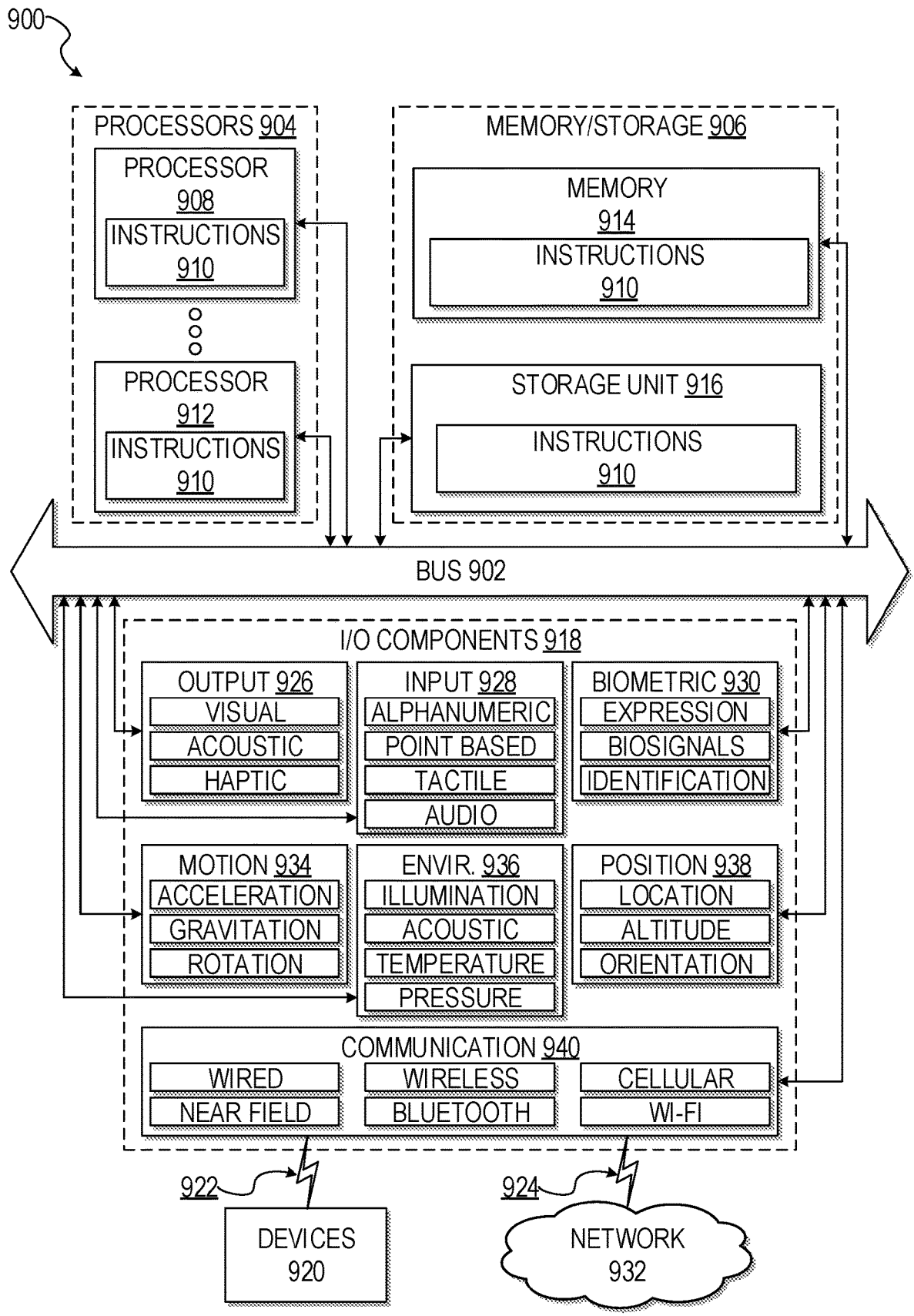
FIG. 9 is a block diagram illustrating components of an exemplary machine, according to some exemplary embodiments, able to read instructions from a machine-readable medium (e.g., a machine-readable storage medium) and perform any one or more of the methodologies discussed herein.

FIG. 9 is a block diagram illustrating components of a machine 900, according to some exemplary embodiments, able to read instructions from a machine-readable medium (e.g., a machine-readable storage medium) and perform any one or more of the methodologies discussed herein. Specifically, FIG. 9 shows a diagrammatic representation of the machine 900 in the exemplary form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various exemplary embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further exemplary embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor; and
memory coupled to the processor and storing instructions that, when executed by the processor, cause the system to perform operations comprising:
identifying a plurality of nodes within an electronic content, each respective node in the plurality of nodes comprising a respective portion of the electronic content;
identifying a plurality of views associated with the electronic content, wherein each respective view is associated with a respective portion of the plurality of nodes;
generating a respective sequence of nodes for each respective view in the plurality of views; and
for each respective view, traversing each respective node in the respective sequence of nodes for the respective view to determine a respective embedding for the respective node for the respective view, wherein traversing each respective node includes sampling a node adjacent to the respective node in the respective sequence of nodes for the respective view; and
determining, based on the determined embedding for each respective node in the plurality of nodes, a respective view-independent embedding for the respective node.

2. The system of claim 1, wherein the electronic content includes one or more of: text, an image, audio, and video.

3. The system of claim 1, wherein traversing each respective node includes sampling a predetermined number of negative samples of nodes, relative to the respective node, in the respective sequence of nodes.

4. The system of claim 3, wherein traversing each respective node includes performing a one-step gradient descent for the respective node based on the sampled adjacent node and the predetermined number of negative samples of nodes.

5. The system of claim 4, wherein the one-step gradient descent updates a direction of an embedding vector associated with the respective node.

6. The system of claim 5, wherein a magnitude of the direction updated to the embedding vector is based on a gradient length.

7. The system of claim 5, wherein determining the respective view-independent embedding for each respective node includes concatenating the embedding vectors from the plurality of views for the respective node.

8. The system of claim 1, wherein determining the respective embedding for the respective nodes for each respective view includes identifying, for each respective view, a set of edges between the respective nodes in the respective view, each edge in the set of edges denoting a relationship between a pair of nodes in the respective view.

9. The system of claim 8, wherein each respective view in the plurality of views comprises edges associated with a respective time frame.

10. The system of claim 8, wherein each respective node is associated with a respective phrase contained within the electronic content.

11. The system of claim 10, wherein an edge between a first node and a second node in a view from the plurality of views denotes a phrase associated with the first node and a phrase associated with the second node are both present in a portion of the electronic content.

12. The system of claim 8, wherein each respective node is associated with a respective user of an online social network described within the electronic content.

13. The system of claim 12, wherein an edge between a first node and a second node in a view from the plurality of views denotes a connection in the online social network between a first user associated with the first node and a second user associated with the second node.

14. The system of claim 1, wherein the plurality of nodes are common to all views in the plurality of views.

15. The system of claim 1, wherein generating the respective sequence of nodes for each respective view includes performing a plurality of random recursive traversals of the plurality of nodes for the respective view.

16. The system of claim 1, wherein determining the respective embedding for each respective node includes initializing an embedding entry based on a uniform sampling of a value associated with the plurality of nodes.

17. The system of claim 1, wherein determining the respective embedding for each respective node includes initializing an embedding entry using a predetermined value.

18. A method comprising:
identifying, by a processor, a plurality of nodes within an electronic content, each respective node in the plurality of nodes comprising a respective portion of the electronic content;
identifying a plurality of views associated with the electronic content, wherein each respective view is associated with a respective portion of the plurality of nodes;
generating a respective sequence of nodes for each respective view in the plurality of views;
for each respective view, traversing each respective node in the respective sequence of nodes for the respective view to determine a respective embedding for the respective node for the respective view, wherein traversing each respective node includes sampling a node adjacent to the respective node in the respective sequence of nodes for the respective view; and
determining, based on the determined embedding for each respective node in the plurality of nodes, a respective view-independent embedding for the respective node.

19. A non-transitory computer-readable medium storing instructions that, when executed by a computer system, cause the computer system to perform operations comprising:
identifying a plurality of nodes within an electronic content, each respective node in the plurality of nodes comprising a respective portion of the electronic content;
identifying a plurality of views associated with the electronic content, wherein each respective view is associated with a respective portion of the plurality of nodes;
generating a respective sequence of nodes for each respective view in the plurality of views;
for each respective view, traversing each respective node in the respective sequence of nodes for the respective view to determine a respective embedding for the respective node for the respective view, wherein traversing each respective node includes sampling a node adjacent to the respective node in the respective sequence of nodes for the respective view; and
determining, based on the determined embedding for each respective node in the plurality of nodes, a respective view-independent embedding for the respective node.

* * * * *